United States Patent
Wang

(10) Patent No.: US 7,228,331 B2
(45) Date of Patent: Jun. 5, 2007

(54) USER ORIENTED PENALTY COUNT RANDOM REJECTION OF ELECTRONIC MESSAGES

(75) Inventor: Bing Wang, San Jose, CA (US)

(73) Assignee: Nokia, Inc., Irving, TX (US)

( * ) Notice: Subject to any disclaimer, the term of this patent is extended or adjusted under 35 U.S.C. 154(b) by 111 days.

(21) Appl. No.: 10/838,581

(22) Filed: May 4, 2004

(65) Prior Publication Data

US 2006/0031507 A1    Feb. 9, 2006

(51) Int. Cl.
G06F 15/16      (2006.01)
(52) U.S. Cl. .................................... 709/203
(58) Field of Classification Search ............. 709/203, 709/206
See application file for complete search history.

(56) References Cited

U.S. PATENT DOCUMENTS

| | | | | |
|---|---|---|---|---|
| 6,052,709 | A * | 4/2000 | Paul ........................... | 709/202 |
| 6,098,053 | A * | 8/2000 | Slater ......................... | 705/44 |
| 6,185,689 | B1 * | 2/2001 | Todd et al. .................. | 726/25 |
| 6,321,267 | B1 * | 11/2001 | Donaldson ................. | 709/229 |
| 6,324,647 | B1 * | 11/2001 | Bowman-Amuah ......... | 726/23 |
| 6,356,937 | B1 * | 3/2002 | Montville et al. .......... | 709/206 |
| 6,571,290 | B2 * | 5/2003 | Selgas et al. ............... | 709/228 |
| 6,748,450 | B1 * | 6/2004 | Dutta ......................... | 709/246 |
| 6,807,564 | B1 * | 10/2004 | Zellner et al. .............. | 709/206 |
| 6,816,878 | B1 * | 11/2004 | Zimmers et al. ........... | 709/200 |
| 6,957,248 | B2 * | 10/2005 | Quine et al. ................ | 709/206 |
| 7,054,907 | B1 * | 5/2006 | Sherwood ................... | 709/206 |
| 2004/0199585 | A1 | 10/2004 | Wang | |
| 2004/0199592 | A1 | 10/2004 | Gould et al. | |

FOREIGN PATENT DOCUMENTS

WO    WO03/003236 A1    9/2003

* cited by examiner

*Primary Examiner*—David Y. Eng
(74) *Attorney, Agent, or Firm*—Brake Hughes Bellermann LLP

(57) ABSTRACT

A method and system for managing electronic mail (email) based on a user oriented penalty count (PC) random rejection. The invention determines a threshold for a specific user and assesses a cumulative PC for usage of a resource that exceeds the user specific threshold. Different operating states are determined based on a status associated with the resource. In a normal operating state, virtually all sent email is processed. In a selective-rejection state, sent email from a user with a cumulative PC is rejected randomly, while others are processed. In a random-rejection state, sent email from a user without a cumulative PC is randomly rejected based on a resource usage factor and an adjustment multiplier, while sent email from a user with a cumulative PC is completely rejected. The user may be assigned an exempt status that enables processing of virtually all email from the user independent of user's PC.

20 Claims, 6 Drawing Sheets

USER ORIENTED PENALTY COUNT RANDOM REJECTION OF ELECTRONIC MESSAGES

FIELD OF THE INVENTION

The present invention relates to network communications, and in particular, to a method and system for user oriented managing of electronic mail.

BACKGROUND

In today's network environment electronic mail (email) systems are rapidly replacing traditional communication systems. Modern email systems include exchange of large files, voice, video, and the like. Proliferation of email systems has brought about security concerns.

Denial of service attacks, including mail flooding, are common problems affecting the security of an email system. In the present state of the art, one possible response is to reject all incoming email during a mail flooding or denial of service attack incident. However, such a response may be undesirable as emails from legitimate senders may be rejected along with emails from a problem sender.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed to a method and system for managing an email system employing a user oriented penalty count random rejection (PCRR).

User oriented PCRR includes a penalty count rejection mechanism that maintains a behavior trace table and a penalty count table. The behavior trace table may be dynamically updated with accumulative statistics of behavior values of each user, including a number of emails, a size of emails, and a connection time. A user specific threshold may be defined for each behavior value. A penalty count may be determined based on a behavior value exceeding the user specific threshold and stored in the penalty count table. The user may be identified by an IP address, an email address, and the like.

A PCRR state machine may include three operating states: normal, selective-rejection, and random-rejection. At the normal operating state, virtually all email may be accepted. At the selective-rejection state, email from the user with a penalty count may be randomly rejected with a probability approximately proportional to the penalty count. At the random-rejection state, where highest alert is raised in the system, virtually all email from the user with a penalty count may be rejected. In the same operating state, email from another user without a penalty count may be randomly rejected with a probability approximately proportional to a usage level of a resource and a user specific adjustment multiplier.

Figure 1:
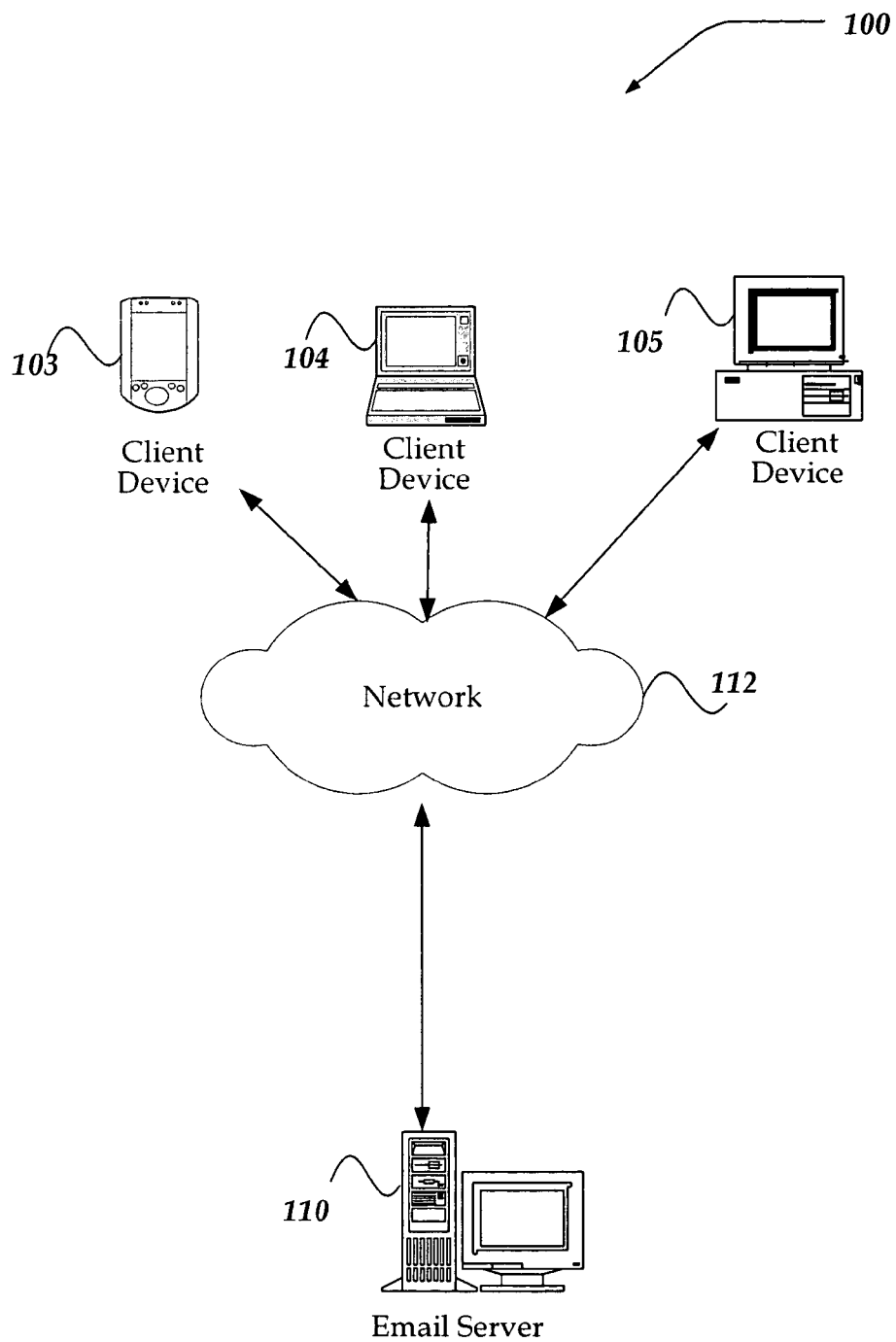
FIG. 1 illustrates one embodiment of an environment in which the invention may operate.

FIG. 1 illustrates one embodiment of an environment in which the present invention may operate. However, not all of these components may be required to practice the invention, and variations in the arrangement and type of the components may be made without departing from the spirit and scope of the invention.

As shown in the figure, system 100 includes client devices 103–105, network 112, and email server 110. Network 112 enables communication between client devices 103–105, and email server 110.

Generally, client devices 103–105 may include virtually any computing device capable of connecting to another computing device to send and receive information, including emails, and other interactive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device, and the like. Similarly, client devices 103–105 may be any device that is capable of connecting using a wired or wireless communication medium such as a PDA, POCKET PC, wearable computer, and any other device that is equipped to communicate over a wired and/or wireless communication medium.

Client devices 103–105 may further include a client application, and the like, that is configured to manage the actions described above. Moreover, client devices 103–105 may also include an email client application, and the like, that is configured to enable an end-user to interact with an email server application, or the like. In one embodiment, the email client is configured to provide various functions, including, but not limited to, authentication, ability to enable an end-user to customize an email feature, synchronization with the email server application, and the like. The email client may further enable inputs, such as keyboard, mouse, audio, and the like. The email client may also perform some email related computations, including, but not limited to audio, visual, and the like. In one embodiment, client devices 103–105 are configured to send, receive and store email related files, executables, audio files, graphic files, and the like.

In another embodiment, the email server application resides on another network device, such as email server 110. However, the invention is not so limited. For example, client devices 103–105 may also be configured to include the email server application, and the like, such that the email client and email server applications may interact on the same client device, or even another client device. Furthermore, although the present invention is described employing a client/server architecture, the invention is not so limited. Thus, other computing architectures may be employed, including but not limited to peer-to-peer, and the like.

Network 112 is configured to couple client devices 103–105, and the like, with each other, and to email server 110. Network 112 is enabled to employ any form of computer readable media for communicating information from one electronic device to another. Also, network 112 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 112 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices, such as client device 102 with various degrees of mobility. For example, network 112 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 112 includes any communication method by which information may travel between client devices 103–105 and email server 110, and the like.

Additionally, network 112 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Email server 110 is described in more detail below in conjunction with FIG. 2. Briefly, however, email server 110 includes virtually any network device configured to include the email server application, and the like. As such, email server 110 may be implemented on a variety of computing devices including personal computers, desktop computers, multiprocessor systems, microprocessor-based devices, network PCs, servers, network appliances, and the like.

Email server 110 may further provide secured communication for interactions and accounting information to speedup periodic update messages between the email client and the email server, and the like. Such update messages may include, but are not limited to a calendar update, contacts update, news update, email update authentication information, and the like.

Figure 2:
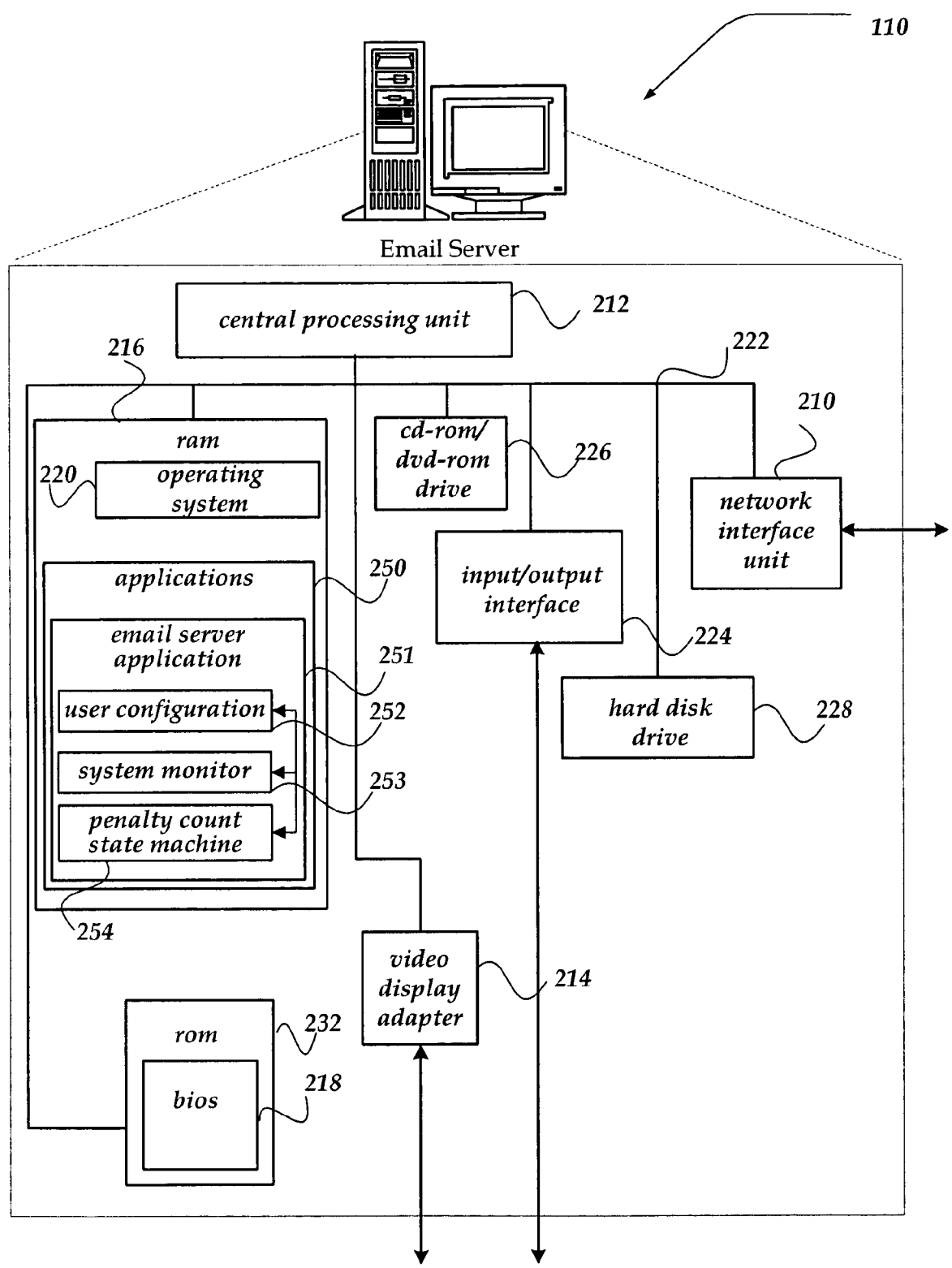
FIG. 2 illustrates a functional block diagram of an email server in accordance with one embodiment of the present invention.

FIG. 2 shows one embodiment of email server 110, according to the present invention. Email server 110 may include many more components than those shown. The components shown, however, are sufficient to disclose an illustrative embodiment for practicing the invention.

Email server 110 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of email server 110. Any general-purpose operating system may be employed. As illustrated in FIG. 2, email server 110 also can communicate with the Internet, or some other communications network, such as network 112 in FIG. 1, via network interface unit 210, which is constructed for use with various communication protocols including the TCP/IP protocols. Network interface unit 210 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. Mass storage may further include applications such as email server application 251.

Email server application 251 may be configured to enable email server 110 manage incoming email by implementing a user oriented penalty count random rejection policy. In one embodiment, email server application 251 may include user configuration 252, system monitor 253, and penalty count state machine 254. User configuration 252 may store an identity, a threshold, and the like determined for each user, a group of users, and the like. System monitor 253 may gather information on a status of a system resource such as those described below in conjunction with FIG. 3. Penalty count state machine 254 may process a cumulative penalty count determined for each user. Email server application 251 may employ information provided by the individual modules in implementing the user oriented penalty count random rejection policy. Email server application 251 may interact with a client application, security application, transport application, and the like, on another device.

Email server 110 may also include an HTTP handler application for receiving and handling HTTP requests, and an HTTPS handler application for handling secure connections. The HTTPS handler application may initiate communication with an external application in a secure fashion. Moreover, email server 110 may further include applications that support virtually any secure connection, including but not limited to TLS, TTLS, EAP, SSL, IPSec, and the like.

Email server 110 may also include input/output interface 224 for communicating with external devices, such as a mouse, keyboard, scanner, or other input devices not shown in FIG. 2. Likewise, email server 110 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

Figure 3A:
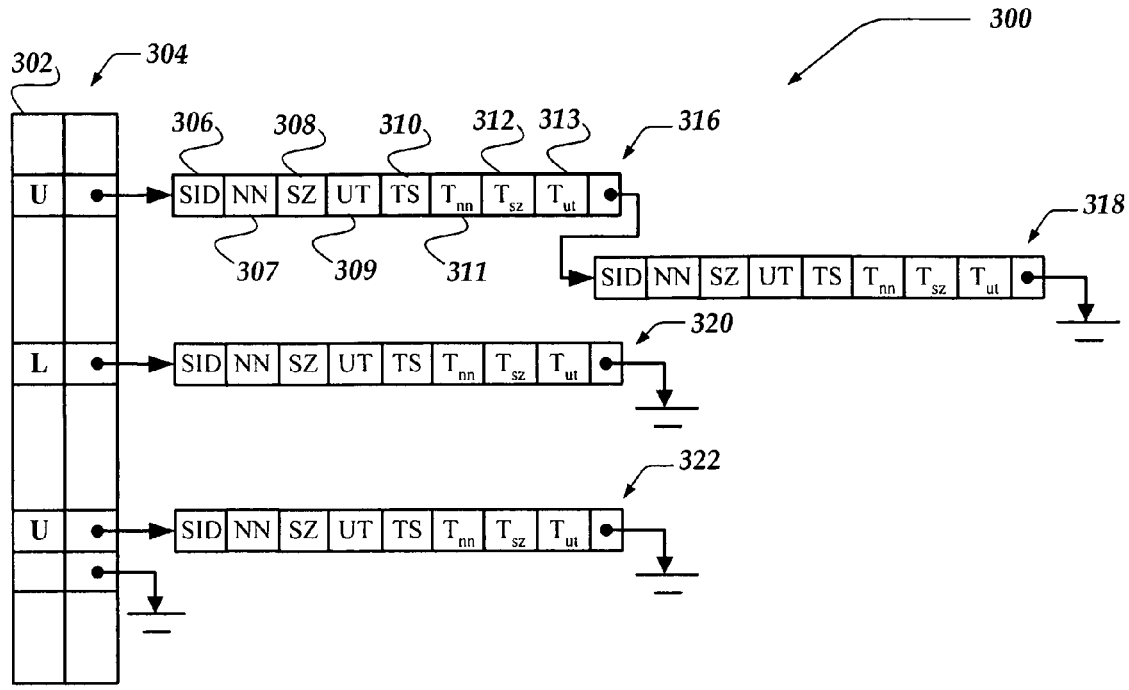
FIG. 3A illustrates an exemplary data structure diagram including a behavior trace table in accordance with another embodiment of the present invention.

FIG. 3A illustrates data structure diagram 300. Data structure diagram 300 includes behavior trace table 304, which may comprise a plurality of records, represented by records 316, 318, 320, and 322. A semaphore feature such as lock/unlock facility 302 may be associated with each table entry for the purpose of synchronization when, for example, a same table entry is accessed by different processes, and the like. The structure of records 318, 320, and 322 is similar to that of record 316, and may include, but is not limited to, user identity (SID) value 306, number of emails (NN) value 307, size of emails (SZ) value 308, TCP connection time (UT) value 309, timestamp (TS) value 310, threshold for number of emails ($T_{nn}$) value 311, threshold for size of emails ($T_{sz}$) value 312, and threshold for connection time ($T_{ut}$) value 313.

Threshold values 311, 312, and 313 may be predetermined by a system administrator, and the like, and may be modified based on a change in a status of the user, and the like. Records 307, 308, and 309 in behavior trace table 304 may be updated every time the user sends an email, or at a predetermined interval. After an update of an entry in behavior trace table 304, accumulative statistics of behavior values (NN, SZ, and UT) may be compared with threshold values 311, 312, and 313 that are configured for each user. Penalty counts may be assessed if a behavior value exceeds a predetermined threshold. If a penalty count is assessed, a penalty count table may be updated as described below in conjunction with FIG. 3B.

Figure 3B:
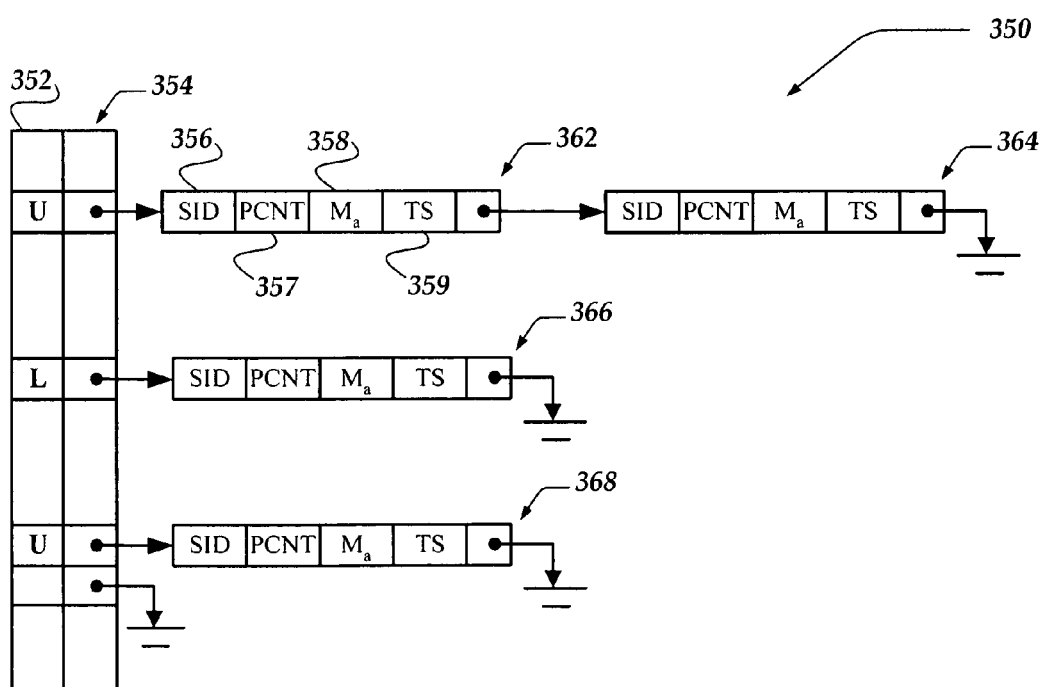
FIG. 3B illustrates an exemplary data structure diagram including a penalty count table in accordance with a further embodiment of the present invention.

FIG. 3B illustrates data structure diagram 350. Data structure diagram 350 includes penalty count table 354. Penalty count table 354 includes a plurality of records, represented by records 362, 364, 366, and 368. Similar to FIG. 3A, a semaphore feature such as lock/unlock facility 352 may be associated with each table entry for the purpose of synchronization when, for example, a same table entry is accessed by different processes, and the like. The structure of records 364, 366, and 368 may be similar to that of record 362, which includes, but is not limited to, user identity (SID) value 356, cumulative penalty count (PNCT) value 357, adjustment multiplier ($M_a$) value 358, and timestamp (TS) value 359.

In one embodiment, a process of looking up user identity values may be optimized by using keys computed from the SIDs to hash penalty count table 354. In a table with 256 entries, for example, the least significant byte of a corresponding user identity value may be used as the hash key. Rehashing may be minimized by a configuration in which each entry of the hash table points to a linked list, where the records are stored in the link list.

Cumulative penalty count value 357 may be a time-dependent parameter that may be updated in accordance with a behavior of the user identified by the corresponding SID value 356, and the like. Timestamp value 359 records a time $T_{TS}$ at which cumulative penalty count value 357 is most recently calculated. Timestamp value 359 may also provide for determining when record 362 becomes out-of-date and may be removed from penalty count table 354. In one embodiment, record 362 may be removed after a retention period $\tau_{PCNT}$. Retention period $\tau_{PCNT}$ may be predetermined by a system administrator based on a system resource, a usage statistic, and the like. Cumulative penalty count (PCNT) value 357 may be derived employing an equation such as:

$$PCNT_n = \min(\kappa, \phi + \alpha),$$

where $\kappa$ is a predetermined maximum value for PCNT, $\alpha$ is a penalty count assessed to the user for a behavior that exceeds the user's threshold. $\phi$ is a previous penalty count assessed to the user, and may be defined by an equation such as:

$$\varphi = PCNT_{n-1} * \left(1 - \frac{t_n - t_{n-1}}{\tau_{PCNT}}\right).$$

As the equation indicates, penalty count is reduced by a decay factor based on time between two status updates and a retention period. Penalty count $\alpha$ may be additive such that the user may be assessed additional penalty counts for each excess behavior over the user's threshold. In one embodiment a weighting factor may be employed for adding penalty counts for behavior associated with different system resources. For example, a weighting factor of 0.5 may be applied to penalty counts for sending a large number of emails exceeding a threshold assigned to the user, and a weighting factor of 0.8 may be applied to penalty counts for exceeding another threshold for the user's TCP connection time, and the like. However, the invention is not limited to these weighting factors, penalty counts, and the like, and others may be employed without departing from the scope of the invention.

Adjustment multiplier ($M_a$) value 358 may be predetermined for a specific user, a user group, and the like by the system administrator, and the like. Adjustment multiplier $M_a$ may be employed in a random-rejection state as described in detail in conjunction with FIG. 7. Briefly, in a random-rejection state, email from users without a PCNT may be rejected randomly based, in part, on a comparison of a resource usage factor and a random number generated by the email server. To introduce a user oriented customization and selectability to the system, the system administrator, and the like, may set adjustment multiplier value 358 from about zero to an arbitrary positive number, inclusive. Prior to comparing the resource usage factor with the random number for determination of random email rejection, the resource usage factor may be multiplied with adjustment multiplier $M_a$. A default value of about one for adjustment multiplier $M_a$ may result in equal distribution of email rejections. A zero value for adjustment multiplier $M_a$ may result in no rejections for emails sent by the user.

Figure 4:
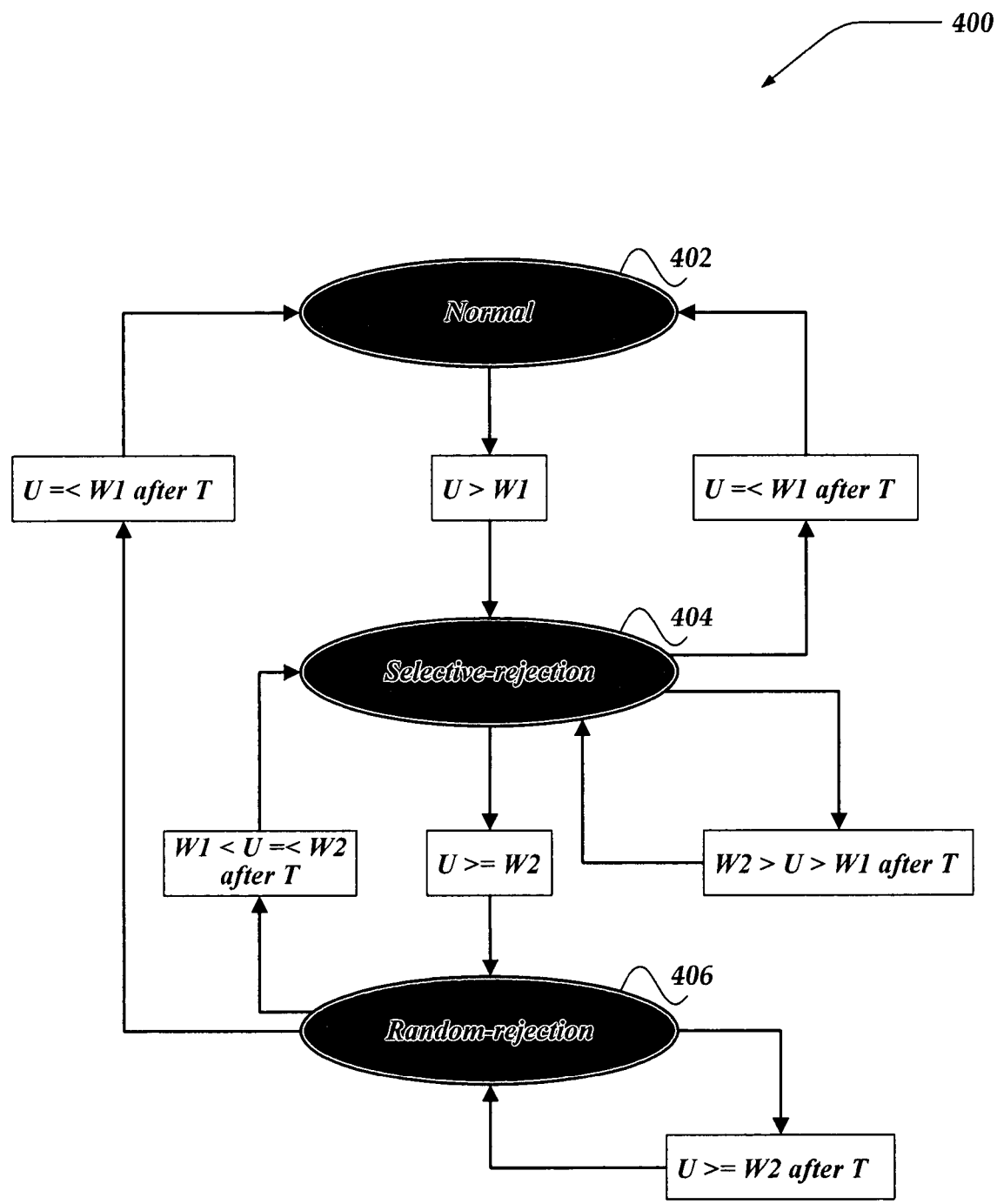
FIG. 4 illustrates a block diagram of a penalty count random rejection state machine.

FIG. 4 illustrates block diagram 400 of penalty count random rejection (PCRR) state machine according to the present invention. As shown in the figure, PCRR state machine includes three operating states: normal operating state 402, selective-rejection state 404, and random-rejection state 406. The operating state may be determined based, in part, on a usage level (U) of a system resource. In one embodiment, the determination may be based on a weighted combination of usage levels of various system resources including, but not limited to, a number of maintained TCP connections, a number of messages in a queue of received messages, an amount of used storage space, and the like. The usage level of the system resource is updated at a predetermined period T. Two threshold usage levels W1 and W2 are also predetermined for switching between operating states.

PCRR state machine may begin operating at normal operating state 402, where U is about equal to or less than W1. If U exceeds W1, PCRR state machine may switch to selective-rejection state 404. A new operating state determination may be made after T. If U is about equal to or less than W1, operating state may return to normal operating state 402. If U is about equal to or greater than W2, operating state may switch to random-rejection state 406. If U is greater than W1, but less than W2, operating state may remain at selective-rejection state 404. At random-rejection state 406, a determination is made again after T. If U is less than W1, operating state may revert to normal operating state 402. If U is less than W2 but more than W1, operating state may switch to selective-rejection state 404. If U is about equal to or greater than W2, operating state may remain at random-rejection state 406.

Figure 5:
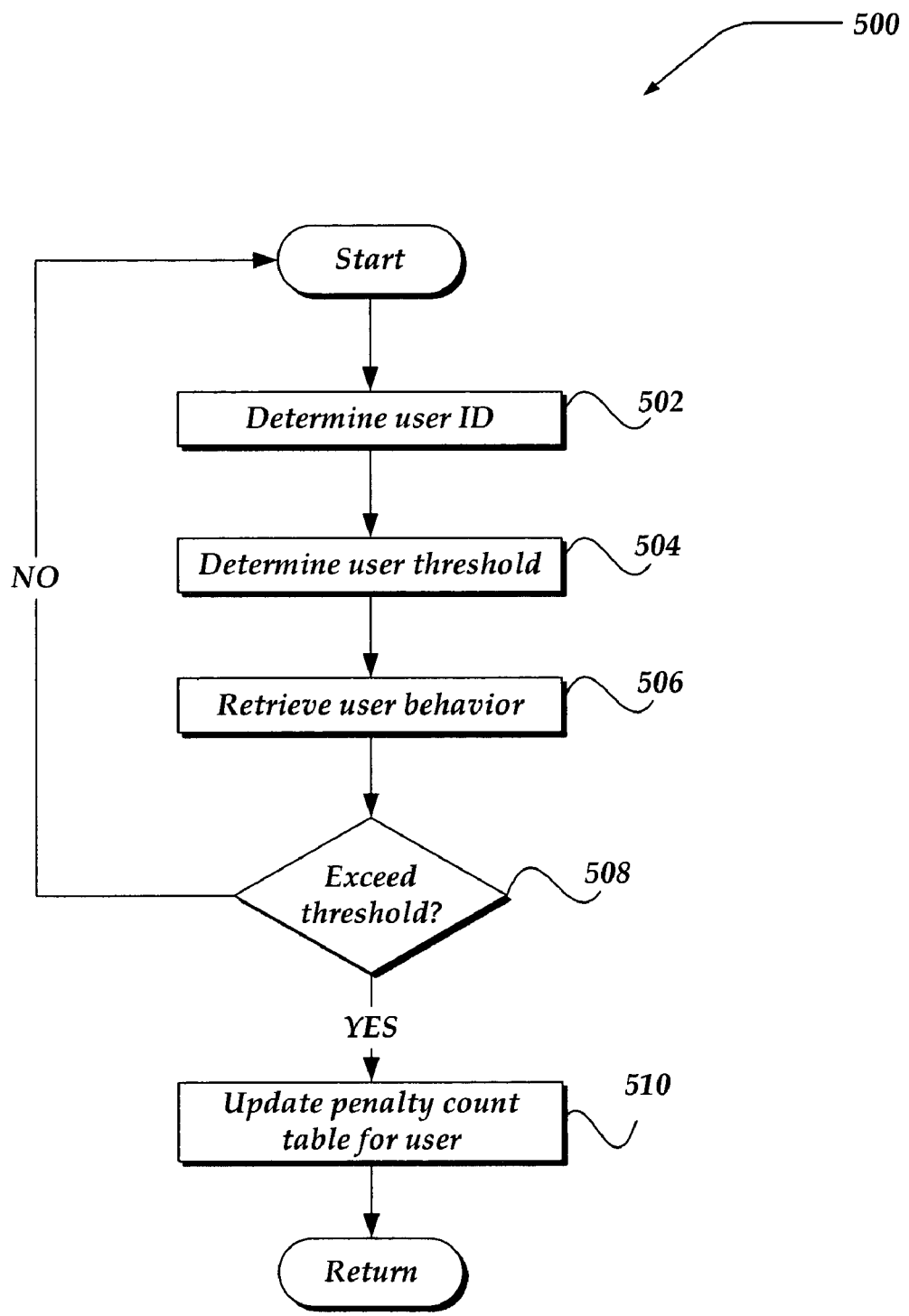
FIG. 5 illustrates a flowchart of a process for maintaining a penalty count table for a user.

FIG. 5 illustrates a flow diagram generally showing process 500 for maintaining a penalty count table for a user, according to one embodiment of the present invention. Process 500 may, for example, be implemented in email server application 251 of FIG. 2.

As shown in the figure, process 500 begins after a start block, at block 502, where an identity of a user is determined. The identity of the user may include an IP address of a client device employed by the user, an email address of the user, and the like. Processing then proceeds to block 504.

At block 504 a threshold associated with the user is determined. The threshold may be previously assigned to the user for a usage of a particular system resource, for a usage of a combination of system resources, and the like. In one embodiment, the threshold may be assigned by a system administrator, and the like, and retrieved at block 504. Processing then proceeds to block 506.

At block 506 a user behavior is retrieved from a behavior trace table. The behavior trace table may be as described in conjunction with FIG. 3A. The user behavior may include the usage of a particular system resource, the usage of a combination of system resources, and the like. Processing next proceeds to decision block 608.

At block 508, a decision is made whether the retrieved user behavior exceeds the threshold determined at block 504 or not. If the decision is negative, processing returns to start block. If the decision is affirmative, processing proceeds to block 510.

At block 510, a penalty count is assessed for the user and a penalty count table is updated. The penalty count table may be as described in conjunction with FIG. 3B. As described below in conjunction with FIG. 6, the user's record in the penalty count table may determine whether an email sent by the user is rejected by the system or not. Upon completion of block 510, processing may return to a calling process to perform other actions.

Figure 6:
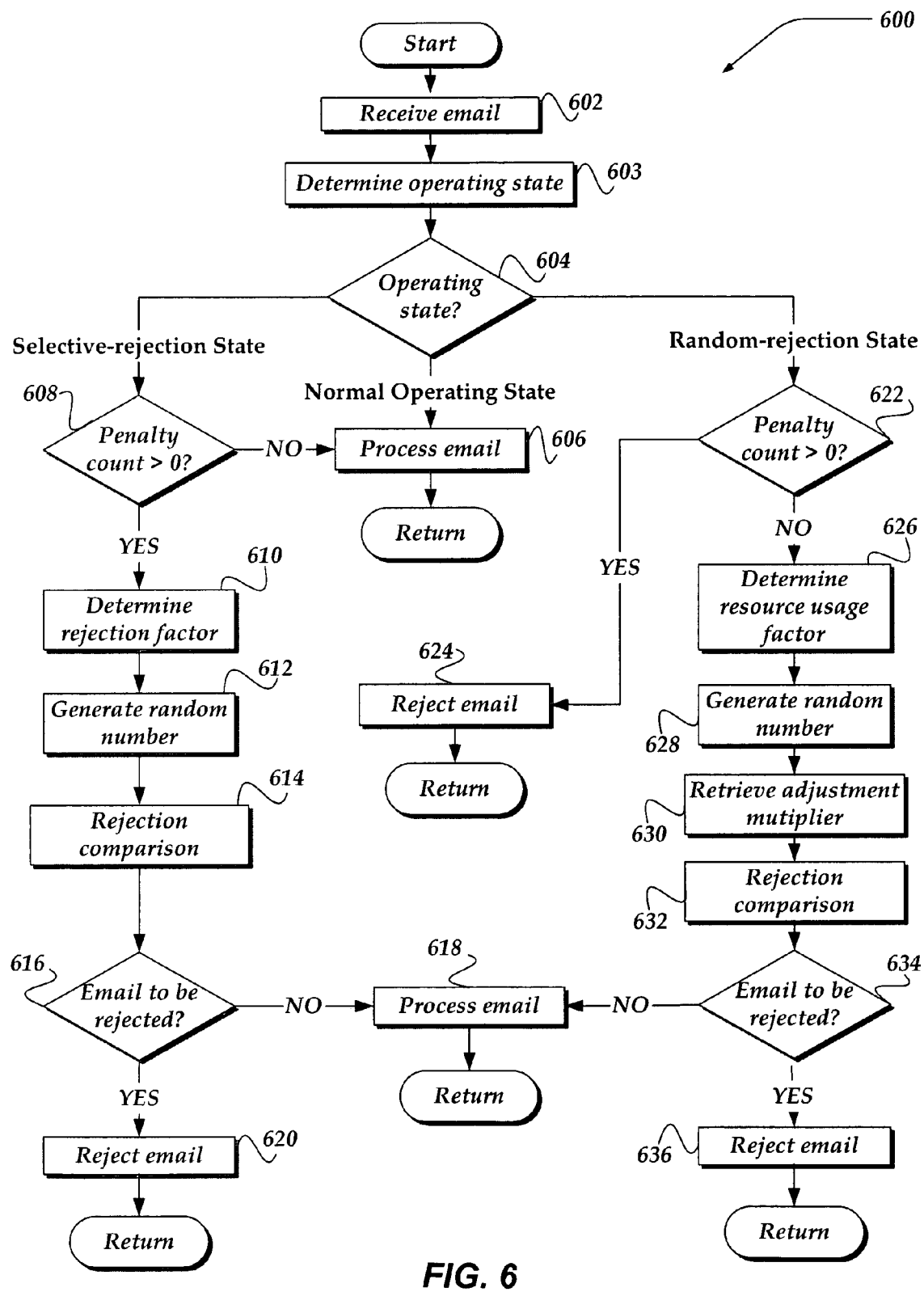
FIG. 6 illustrates a flowchart of a process implementing user oriented penalty count random rejection.

FIG. 6 illustrates a flow diagram generally showing process 600 for implementing a user oriented penalty count random rejection policy, according to one embodiment of the invention. Process 600 may, for example, be implemented in email server 110 of FIG. 1.

As shown in the figure, process 600 begins after a start block, at block 602, where an email is received from a user. Processing then proceeds to block 603.

At block 603, an operating state of the email server employing the penalty count random rejection policy is determined. The operating state may include a normal operating state, a selective-rejection state, and a random-rejection state. Processing then proceeds to decision block 604.

At block 604, a decision is made as to which operating state's rules may be followed. If the decision is selective-rejection state, processing proceeds to decision block 608. If the decision is normal operating state, processing proceeds to block 606. If the decision is random-rejection state, processing proceeds to decision block 622.

Normal Operating State:

At block 606, virtually all email sent by the user is allowed to be processed. Processing of the email may include, forwarding the email, storing the email, and the like. Upon completion of block 606, processing returns to a calling process to perform other activities.

Selective-Rejection State:

At block 608, a decision is made whether a cumulative penalty count for the user is greater than about zero. If the decision is negative, processing proceeds to block 606 to perform above described actions. If the decision is affirmative, processing proceeds to block 610.

At block 610, a rejection factor is determined for the email sent by the user based, in part, on the cumulative penalty count of the user. In one embodiment, the rejection factor may include a number that is multiplied with the cumulative penalty count resulting in the rejection factor having a value between about zero and an arbitrary positive number, and the like. Processing then proceeds to block 612.

At block 612, a random number is generated. In one embodiment, the random number may have a value between about zero and an arbitrary positive number, inclusive. The random number may be employed for random rejection of emails from the user with a probability proportional to the cumulative penalty count of the user. Processing then proceeds to block 614.

At block 614, a comparison is performed between the random number and the rejection factor. In one embodiment, the email from the user may be rejected, if the rejection factor is greater than about the random number. In another embodiment, the email from the user may be rejected, if the rejection factor is less than about the random number. The comparison between the random number and the rejection factor provides for rejection of the email based on the probability approximately proportional to the cumulative penalty count of the user. In a further embodiment, the user may be assigned an exempt status, where virtually all email from the user may be processed regardless of the user's penalty count status (not shown). Processing then proceeds to decision block 616.

At block 616, a decision is made whether the email is rejected or not. If the decision is affirmative, processing proceeds to block 620, where the user is notified about the rejection and then processing returns to a calling process to perform further actions. If the decision is negative, processing proceeds to block 618.

At block 618, the email from the user is processed as described above. Upon completion of block 618, processing returns to a calling process to perform further actions.

Random-Rejection State:

At block 622, a decision is made whether the penalty count of the user is greater than about zero. If the decision is affirmative, processing proceeds to block 624. If the decision is negative, processing proceeds to block 626.

At block 624, virtually all email from the user is rejected. Upon completion of block 624, processing returns to a calling process to perform further actions.

At block 626, a resource usage factor is determined based, in part, on a usage level of a particular system resource, a combination of system resources, a weighted combination of system resources, and the like. The system resource may include a number of maintained TCP connections, a number of messages in a queue of received messages, an amount of used storage space, and the like. In one embodiment, the resource usage factor may be modified if the usage level of the system resource changes. Processing then proceeds to block 628.

At block 628, a random number is generated. In one embodiment, the random number may have a value between about zero and the predetermined maximum, inclusive. The random number may be employed for random rejection of emails from the user with a probability approximately proportional to the usage level of system resource(s). Processing then proceeds to block 630.

At block 630, an adjustment multiplier that is predetermined for the user is retrieved. In one embodiment, the adjustment multiplier may be between about zero and an arbitrary positive number. Processing then proceeds to block 632.

At block 632, a comparison is performed between the random number and the product of the resource usage factor and the adjustment multiplier. In one embodiment, the email from the user may be rejected, if the product is greater than about the random number. In another embodiment, the email from the user may be rejected, if the product is less than about the random number. The comparison between the random number and the product of the resource usage factor and the adjustment multiplier provides for rejection of the email based on a probability approximately proportional to the usage level of the system resource(s) and the adjustment multiplier. In a further embodiment, the adjustment multiplier may be selected about zero resulting in virtually all email from the user being processed in the random-rejection state regardless of the usage level of the system resource(s). Processing then proceeds to decision block 634.

At block 634, a decision is made whether the email from the user is rejected based on the comparison performed at block 632 or not. If the decision is negative, processing proceeds to block 618 to perform above described actions. If the decision is affirmative, processing proceeds to block 636.

At block 636, the email is rejected. Upon completion of block 636, processing returns to a calling process to perform further actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Although the invention is described in terms of communication between an email server and an email client employed by a user, and exchange of emails, the invention is not so limited. For example, the communication may be between virtually any resource, including but not limited to multiple users, multiple servers, and any other device, and include any type of messaging without departing from the scope of the invention. Furthermore, references to a system resource include any resource associated with a system in accordance with the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

I claim:

1. A method for managing an electronic message, comprising:
   determining a threshold based, in part, on an identity associated with a user;
   determining a cumulative penalty count based, in part, on a usage of a resource by the user and the threshold; and
   managing the message sent by the user, wherein the managing comprises determining whether to reject the message based, in part, on the cumulative penalty count and a status associated with the resource, and rejecting the message if the determination of whether to reject the message is affirmative.

2. The method of claim 1, wherein the identity further comprises at least one of an IP address of a client device and an email address employed by the user.

3. The method of claim 1, wherein determining the cumulative penalty count further comprises:
   assessing a penalty count based, in part, on the usage of the resource by the user exceeding the threshold, wherein the threshold is associated with at least one of a size of a message sent by the user, a number of messages sent by the user, and connection time of the user to a message server;
   reducing the penalty count by a decay factor; and
   accumulating the penalty count for each resource.

4. The method of claim 3, further comprising assigning an exempt status to the user and exempting the user from receiving penalty counts for usage of the resource.

5. The method of claim 3, wherein the decay factor is determined based on a time between two updates of the status and a predetermined retention period.

6. The method of claim 1, wherein the status is determined based on at least one of a number of a maintained TCP connection, a number of messages in a queue of received messages, and an amount of used storage space.

7. The method of claim 1, further comprising determining an operating state based, in part, on the status, wherein the operating state includes one of a normal operating state, a selective-rejection state, and a random-rejection state.

8. The method of claim 7, wherein managing the message in the normal operating state further comprises enabling virtually all sent messages from virtually all users to be processed.

9. The method of claim 7, wherein managing the message in the selective rejection state further comprises:
   if the cumulative penalty count is about zero for the user, allowing virtually all sent messages by that user to be processed; and
   if the cumulative penalty count is greater than about zero for the user:
      determining a rejection factor base 4 in part, on the cumulative penalty count;
      generating a random number; and
      rejecting the message sent by that user based, in part, on a comparison of the rejection factor and the random number.

10. The method of claim 7, wherein managing the message in the random-rejection state further comprises:
   if the cumulative penalty count is greater than about zero for the user, rejecting virtually all sent messages by that user; and
   if the cumulative penalty count is about zero for the user:
      determining a resource usage factor based, in part, on the usage of the resource;
      generating a random number; and
      rejecting the message sent by that user based, in part, on a comparison of the random number and a product of the resource usage factor with a predetermined adjustment multiplier for the user.

11. The method of claim 10, wherein virtually all sent messages by the user are processed in the random-rejection state, if the adjustment multiplier is assigned a value of about zero.

12. A message server, comprising:
   a transceiver configured to receive a message from a user;
   a memory configured to store a threshold and a cumulative penalty count associated with the user; and
   a processor configured to perform actions including:
      determining the threshold based, in part, on an identity associated with the user;
      determining the cumulative penalty count based, in part, on a usage of a resource by the user and the threshold; and
      implementing a random rejection policy for the message sent by the user based, in part, on the cumulative penalty count and a status associated with the resource.

13. The message server of claim 12, wherein the processor is further configured to determine the cumulative penalty count by performing actions including:
   assessing a penalty count based, in part, on the usage of the resource by the user exceeding the threshold;
   reducing the penalty count by a decay factor, wherein the decay factor is determined based on a time between two status updates and a predetermined retention period; and
   accumulating penalty counts for each resource.

14. The message server of claim 12, wherein the penalty count is assessed for at least one of a size of a message sent by the user, a number of messages sent by the user, and connection time of the user to the message server.

15. The message server of claim 12, wherein the processor is further configured to determine an operating state based, in part, on the status.

16. The message server of claim 15, wherein the random rejection policy is implemented in a normal operating state by enabling virtually all sent messages to be processed.

17. The message server of claim 15, wherein the processor is further configured to implement the random rejection policy in a selective-rejection state by performing actions including:
   if the cumulative penalty count is about zero for the user, enabling virtually all sent messages by that user to be processed; and
   if the cumulative penalty count is greater than about zero for the user:
      determining a rejection factor based, in part, on the cumulative penalty count;
      generating a random number; and
      rejecting the message sent by that user based, in part, on a comparison of the rejection factor and the random number.

18. The message server of claim 15, wherein the processor is further configured to implement the random rejection policy in a random-rejection state by performing actions including:
   if the cumulative penalty count is greater than about zero for the user, rejecting virtually all sent messages by that user; and
   if the cumulative penalty count is about zero for the user:
      determining a resource usage factor based, in part, on the status;
      generating a random number, and
      rejecting the message sent by that user based, in part, on a comparison of the random number and a product of the resource usage factor with a predetermined adjustment multiplier.

19. A machine-readable storage medium comprising computer executable instructions configured to cause a computer to perform the actions of:
   enabling a determination of an identity associated with a user and a threshold for the user based on the identity;
   enabling a determination of a cumulative penalty count based, in part, on a usage of a resource by the user and the threshold;
   enabling a determination of a status associated with the resource; and
   enabling implementation of a random message rejection policy based, in part, on the cumulative penalty count for the user and the status.

20. A device managing an electronic message, comprising:
   a means for receiving the message from a user;
   a means for determining an identity associated with the user;
   a means for determining a threshold for the user based on the identity;

a means for monitoring usage of a resource by the user and determining a cumulative penalty count based on the usage;

a means for determining a status associated with the resource; and a means for implementing a random message rejection policy based, in part, on the cumulative penalty count for the user and the status.

* * * * *